(12) United States Patent
Gorokhov et al.

(10) Patent No.: US 8,219,030 B2
(45) Date of Patent: Jul. 10, 2012

(54) ADAPTIVE DISTRIBUTED FREQUENCY PLANNING

(75) Inventors: Alexei Gorokhov, San Diego, CA (US); Avneesh Agrawal, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 916 days.

(21) Appl. No.: 12/142,480

(22) Filed: Jun. 19, 2008

(65) Prior Publication Data

US 2009/0075596 A1   Mar. 19, 2009

Related U.S. Application Data

(60) Provisional application No. 60/945,323, filed on Jun. 20, 2007.

(51) Int. Cl.
H04B 17/00 (2006.01)
(52) U.S. Cl. ....... 455/62; 455/226.3; 455/509; 455/135; 455/166.2
(58) Field of Classification Search .......... 455/509, 455/447, 452.1, 456.1, 456.2, 452.2, 450, 455/451, 449, 62, 550.1, 63.1, 67.11, 67.16, 455/135, 150.1, 115.1, 513, 515; 370/252, 370/254, 389, 329, 328; 375/133, 316, 346
See application file for complete search history.

(56) References Cited

U.S. PATENT DOCUMENTS

| | | | | |
|---|---|---|---|---|
| 5,485,631 | A * | 1/1996 | Bruckert | 455/446 |
| 2005/0272432 | A1* | 12/2005 | Ji et al. | 455/449 |
| 2006/0135169 | A1* | 6/2006 | Sampath et al. | 455/447 |
| 2007/0143764 | A1* | 6/2007 | Kern et al. | 718/104 |
| 2008/0020778 | A1* | 1/2008 | Pi | 455/450 |
| 2008/0085720 | A1* | 4/2008 | Hirano et al. | 455/452.1 |
| 2008/0095071 | A1* | 4/2008 | Lu et al. | 370/254 |
| 2008/0214200 | A1* | 9/2008 | Grandblaise et al. | 455/452.2 |
| 2008/0287130 | A1* | 11/2008 | Laroia et al. | 455/436 |
| 2009/0022098 | A1* | 1/2009 | Novak et al. | 370/329 |
| 2009/0325585 | A1* | 12/2009 | Farajidana et al. | 455/450 |

FOREIGN PATENT DOCUMENTS

EP   1662826   5/2006
(Continued)

OTHER PUBLICATIONS

International Search Report—PCT/US2008/067756, International Search Authority—European Patent Office—Dec. 10, 2008.
(Continued)

*Primary Examiner* — Tan Trinh
(74) *Attorney, Agent, or Firm* — Donald C. Kordich

(57) ABSTRACT

Systems and methodologies are described that facilitate employing distributed frequency planning and reuse factor optimization based upon forward link and/or reverse link interference management techniques. An optimal reuse factor for a base station can be determined based upon a metric that evaluates levels of service associated with neighboring base stations. Moreover, a subset of available resource sets can be selected for use by the base station; thus, a base station specific collection of resource sets can be formed through such selection. Further, mappings of each resource set to a set of physical resources can be disseminated in a network or portion thereof. According to another example, frequency hopping can be constrained to use of resources within a resource set (rather than across more than one resource set) as provided in a base station specific hopping pattern.

55 Claims, 11 Drawing Sheets

FOREIGN PATENT DOCUMENTS

| | | |
|---|---|---|
| JP | 2005502218 A | 1/2005 |
| JP | 2008502280 A | 1/2008 |
| JP | 2008526125 A | 7/2008 |
| RU | 2193290 C2 | 11/2002 |
| WO | WO9731503 A1 | 8/1997 |
| WO | 0249305 | 6/2002 |
| WO | WO2005125262 | 12/2005 |
| WO | WO2006069302 | 6/2006 |
| WO | 2007021139 | 2/2007 |
| WO | WO2008157799 | 12/2008 |

OTHER PUBLICATIONS

Written Opinion—PCT/US2008/067756, International Search Authority—European Patent Office—Dec. 10, 2008.

* cited by examiner

ADAPTIVE DISTRIBUTED FREQUENCY PLANNING

CROSS-REFERENCE TO RELATED APPLICATIONS

This application claims the benefit of U.S. Provisional Patent application Ser. No. 60/945,323 entitled "METHOD AND APPARATUS FOR ADAPTIVE DISTRIBUTED FREQUENCY PLANNING" which was filed Jun. 20, 2007. The entirety of the aforementioned application is herein incorporated by reference.

BACKGROUND

I. Field

The following description relates generally to wireless communications, and more particularly to adaptive frequency planning in a distributed manner in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g. bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Resource planning (e.g., frequency planning, ... ) is employed in wireless communication systems to allocate resources for use in connection with disparate base stations, where such allocation of resources is typically performed for interference management purposes. For instance, a first collection of resources can be used in connection with a first base station (e.g., for uplink and/or downlink transmissions, ... ), while a second collection of resources can be utilized in connection with a second base station (e.g., for uplink and/or downlink transmissions, ... ). Commonly, resource planning is effectuated in a centralized manner where each base station can obtain a predefined indication as to a collection of resource set(s) and/or a reuse factor to leverage when scheduling uplink and/or downlink communication; thus, a particular base station can employ a subset of overall available resources in the system based upon this predetermined indication.

Moreover, conventional resource planning techniques oftentimes apply to planned deployments. By way of example, in a planned deployment, coverage regions of different base stations can overlap in a predictable manner; thus, fractional frequency planning similar to frequency planning for classic reuse schemes can be used. Further, a reuse factor, which is a fraction of the total bandwidth to be used by a given base station, can be pre-computed in planned deployments based on deployment topology. However, common techniques typically are unable to account for poor interference conditions on the uplink and/or downlink that are encountered in an unplanned deployment.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating employment of distributed frequency planning and reuse factor optimization based upon forward link and/or reverse link interference management techniques. An optimal reuse factor for a base station can be determined based upon a metric that evaluates levels of service associated with neighboring base stations. Moreover, a subset of available resource sets can be selected for use by the base station; thus, a base station specific collection of resource sets can be formed through such selection. Further, mappings of each resource set to a set of physical resources can be disseminated in a network or portion thereof. According to another example, frequency hopping can be constrained to use of resources within a resource set (rather than across more than one resource set) as provided in a base station specific hopping pattern.

According to related aspects, a method that facilitates distributed selecting of resource sets to use for user assignments in a wireless communication environment is described herein. The method can include selecting a subset of resource sets based upon a first metric from a set of available resource sets commonly defined across a network to form a base station specific collection. Further, the method can comprise assigning resources included in resource sets from the base station specific collection to served access terminals for scheduled transmissions.

Another aspect relates to a wireless communications apparatus. The wireless communications apparatus can include a memory that retains instructions related to choosing a subset of resource sets based upon a first metric from a set of available resource sets commonly defined across a network to form a base station specific collection and allocating resources included in resource sets from the base station specific collection to served access terminals for scheduled transmissions. Further, the wireless communications apparatus can include a processor, coupled to the memory, configured to execute the instructions retained in the memory.

Yet another aspect relates to a wireless communications apparatus that enables adaptively selecting a subset of resource sets to utilize in a wireless communication environment. The wireless communications apparatus can include means for identifying an optimal reuse factor for a base station as a function of a metric based upon a level of service associated with at least one neighboring base station. Further, the wireless communications apparatus can include means for selecting a fraction of available resource sets that are commonly defined across a network to form a base station specific collection, the fraction being based upon the optimal reuse factor. Moreover, the wireless communications apparatus can include means for allocating resources included in the resource sets from the base station specific collection to served access terminals.

Still another aspect relates to a computer program product that can comprise a computer-readable medium. The computer-readable medium can include code for determining an optimal reuse factor corresponding to a base station based upon a first metric that considers level of service associated with at least one disparate base station. Moreover, the computer-readable medium can include code for selecting a fraction of available resource sets that are commonly defined across a network to each map to certain sets of physical resources, the fraction being selected to generate a base station specific collection, the fraction being a function of the optimal reuse factor.

In accordance with another aspect, an apparatus in a wireless communication system can include a processor, wherein the processor can be configured to determine an optimal reuse factor corresponding to a base station based upon a metric that considers level of service associated with at least one neighboring base station. The processor can also be configured to select a fraction of available resource sets that are commonly defined across a network to form a base station specific collection, the fraction being based upon the optimal reuse factor. Further, the processor can be configured to assign resources included in resource sets from the base station specific collection to served access terminals for scheduled transmission. Moreover, the processor can be configured to vary the resources assigned within at least one of the resource sets from the collection over time using a base station specific frequency hopping pattern for at least one of the scheduled transmission.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
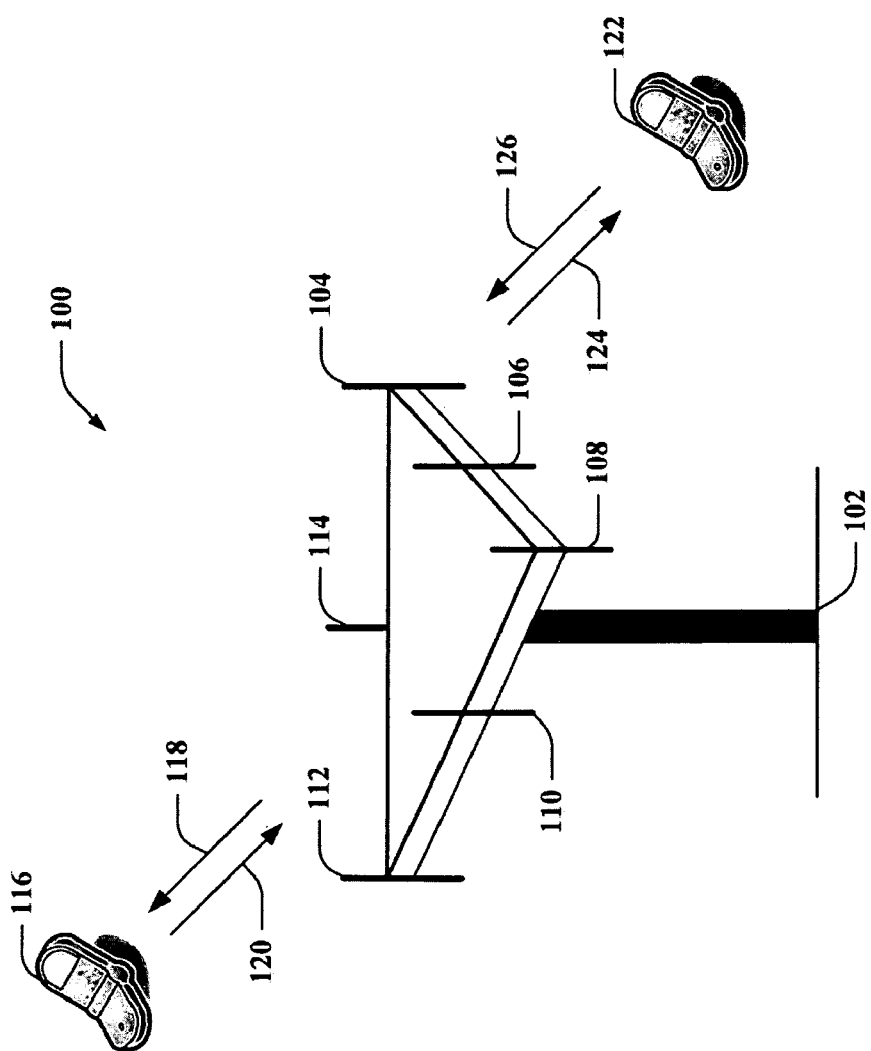
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 employs forward link and/or reverse link interference management techniques for distributed frequency planning and/or reuse factor optimization. Thus, in an unplanned deployment (e.g., where bad interference conditions can exist on the forward link and/or the reverse link), a collection of resource sets can be selected by base station 102 (e.g., the resource sets in the collection can be used for forward link and/or reverse link assignments provided to access terminals 116, 122). Moreover, disparate base station(s) (not shown) can similarly choose respective collections of resource sets. Thus, as compared to conventional techniques, system 100 supports distributed resource set selection (e.g., rather than each base station being assigned particular resource sets for use by a centralized node, device, controller, etc.).

Each base station can employ a subset of the overall available resource sets (e.g., each collection can be a subset/fraction of the total number of resource sets, . . . ). Further, a first collection selected by a first base station (e.g., base station 102, disparate base station, . . . ) can include at least one substantially similar resource set and/or at least one differing resource set as compared to a second collection chosen by a second base station (e.g., disparate base station, base station 102, . . . ). Moreover, the resource sets in a collection chosen by a given base station can vary over time (e.g., base station 102 can adaptively add and/or remove the resource sets in its respective collection as a function of time, . . . ).

Further, each base station can determine a respective reuse factor to employ. The reuse factor can dictate a fraction of the total bandwidth to be used by the corresponding base station (e.g., a fraction of the overall available resource sets that can be included in a respective collection, . . . ). Accordingly, base station 102 can leverage metric(s) to determine a respective reuse factor, while a disparate base station 102 can utilize such metric(s) to determine a disparate, respective reuse factor. Moreover, reuse factors can adaptively be selected for each base station as a function of time.

Figure 2:
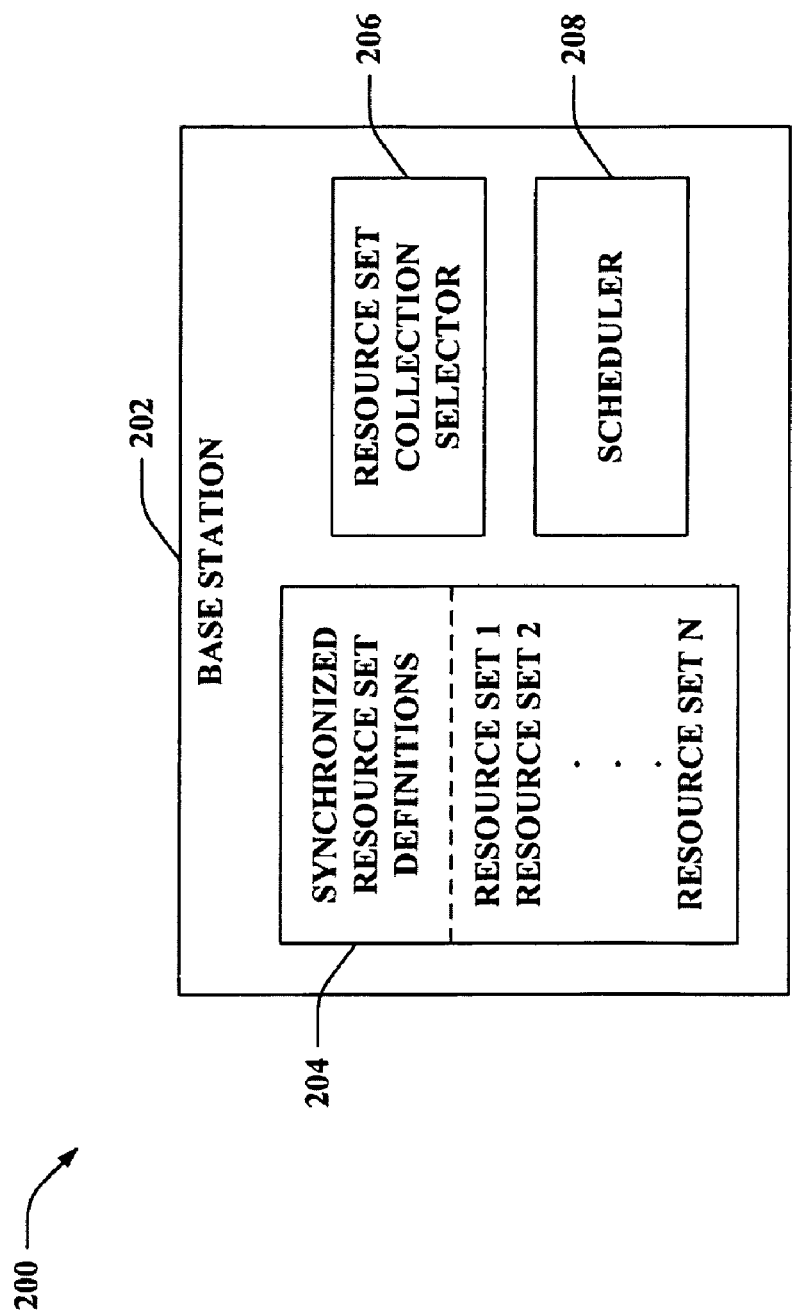
FIG. 2 is an illustration of an example system that adaptively elects a subset of resource sets from a set of resource sets for use in a wireless communication environment.

Now referring to FIG. 2, illustrated is a system 200 that adaptively elects a subset of resource sets from a set of resource sets for use in a wireless communication environment. System 200 includes a base station 202 that can transmit and/or receive information, signals, data, instructions, commands, bits, symbols, and the like. For instance, base station 202 can communicate with one or more access terminals (not shown) via the forward link and/or reverse link. Moreover, although not shown, it is contemplated that any number of base stations similar to base station 202 can be included in system 200 (e.g., a common wireless communication environment, . . . ), and each of these base stations can similarly elect respective subsets of resources sets to utilize for forward link and/or reverse link communication as described below.

Base station 202 can include synchronized resource set definitions 204. Synchronized resource set definitions 204 can set forth Orthogonal Frequency Division Multiple Access (OFDMA) units (e.g., time/frequency units, . . . ) included in a plurality of resource sets (e.g., resource set 1, resource set 2, . . . , resource set N, where N can be substantially any integer) that can be used by base station 202 and/or any disparate base station(s). For instance, synchronized resource set definitions 204 can be retained in memory (not shown) of base station 202. Further, synchronized resource set definitions 204 can be commonly known across a network such that base station 202 and any disparate base station(s) have substantially similar synchronized resource set definitions retained in respective memories. Moreover, by way of example, synchronized resource set definitions 204 can be predefined, received upon initialization of base station 202 (e.g., from a network node, disparate base station, . . . ), updated (e.g., via a received indication, . . . ), and so forth.

Each resource set in synchronized resource set definitions 204 maps to the same physical set of resources across a network or part of a network. As described in synchronized resource set definitions 204, each resource set is a collection of sub-zones (e.g., sub-bands, . . . ) on some interlaces. Further, a sub-zone is defined as a set of logical tones across a physical (PHY) flame. For example, the size of a sub-zone can be 64 tones, 128 tones, etc. By way of further illustration, 32 different resource sets can be set forth in synchronized resource set definitions 204 (e.g., N can equal 32, . . . ), where 8 interlaces are employed with 4 sub-zones; accordingly, 32 resource sets enables frequency planning with ~3% granularity. It is to be appreciated, however, that the claimed subject matter is not limited to the aforementioned illustration.

Further, frequency planning can be achieved by defining the same (or substantially similar) structure of all (or most) possible resource sets in all (or most) base stations (e.g., base station 202 and disparate base station(s) within a common network, . . . ). Moreover, frequency planning can be achieved by assigning different collections of resource sets to different base stations. In a distributed planning model, base station 202 (and disparate base station(s)) can grab and/or drop a particular resource set from an associated collection with a resource set collection selector 206 based on one or more functions (e.g., cost functions, . . . ), criteria, metrics (e.g., forward link, reverse link, . . . ), and the like.

Resource set collection selector 206 chooses a subset of the resource sets described in synchronized resource set definitions 204 to include in a collection of resource sets corresponding to base station 202. For instance, resource set collection selector 206 can select one or more resource sets to be included in the collection upon initialization of base station 202. According to another example, resource set collection selector 206 can adaptively add and/or remove resource set(s) from the collection associated with base station 202 over time, which can enable the collection to be updated based upon changes in environmental conditions, number of users being served (e.g., by base station 202 and/or neighboring base station(s)), variations in interference, alterations to collection(s) of disparate base station(s), and the like. Further, disparate base stations in the wireless communications environment network can employ respective resource set collection selectors associated therewith, which can each be similar to resource set collection selector 206, for selecting respective subsets of the available resource sets defined in the commonly understood synchronized resource set definitions to be included in respective collections.

For example, a reuse factor can specify a fraction of the total bandwidth that can be used by base station 202. Thus, resource set collection selector 206 can employ the reuse factor when forming the collection of resource sets for base station 202. By way of illustration, the reuse factor can indicate that X % of the total number of resource sets as set forth in synchronized resource set definitions 204 can be used by base station 202, where X can be substantially any real number less than 100 and greater than 0. Hence, resource set collection selector 206 can choose X % of the total number of resource sets to be included in the collection for base station 202 (e.g., the chosen X % of the overall number of resource sets can be the subset of resource sets selected for base station 202, . . . ). Resource set collection selector 206 can select the X % of the total number of resource sets based upon forward link metrics and/or reverse link metrics. Moreover, the remaining 100–X % of the total number of resource sets can remain unused by base station 202 (e.g., excluded from the collection yielded by resource set collection selector 206, . . . ) to enhance overall network throughput (e.g., to allow neighboring base station(s) to serve users in bad interference conditions, . . . ). Thus, system 200 can be a distributed fractional frequency reuse system where each base station can have a certain percentage of overall system resources that are unused, thereby allowing neighboring base stations to schedule users upon at least a portion of such unused resources. Further, system 200 can provide distributed interference management.

It is to be appreciated that the reuse factor can be unique to base station 202 or common for a plurality of base stations including base station 202. Moreover, it is contemplated that the reuse factor can be statically assigned to base station 202 and/or dynamically allocated to base station 202. By way of further illustration, an optimal reuse factor for base station 202 can be dynamically determined by base station 202 in a distributed fashion as described below.

Base station 202 can further include a scheduler 208 that schedules resource sets from the collection generated by resource set collection selector 206 to one or more access terminals (not shown) being served by base station 202. Scheduler 208 can allocate the resource sets included in the collection for forward link and/or reverse link transmissions. Thus, upon resource set collection selector 206 forming a collection of resource sets specific to base station 202, scheduler 208 can allot the resource sets to access terminals within proximity for forward link and/or reverse link communication.

It is to be appreciated that the adaptive distributed frequency planning described herein can be utilized in conjunction with an Ultra Mobile Broadband (UMB) based system. According to another illustration, the adaptive distributed frequency planning described herein can be employed in conjunction with a Long Term Evolution (LTE) based system. However, the claimed subject matter is not limited to being employed in UMB or LTE based systems.

Figure 3:
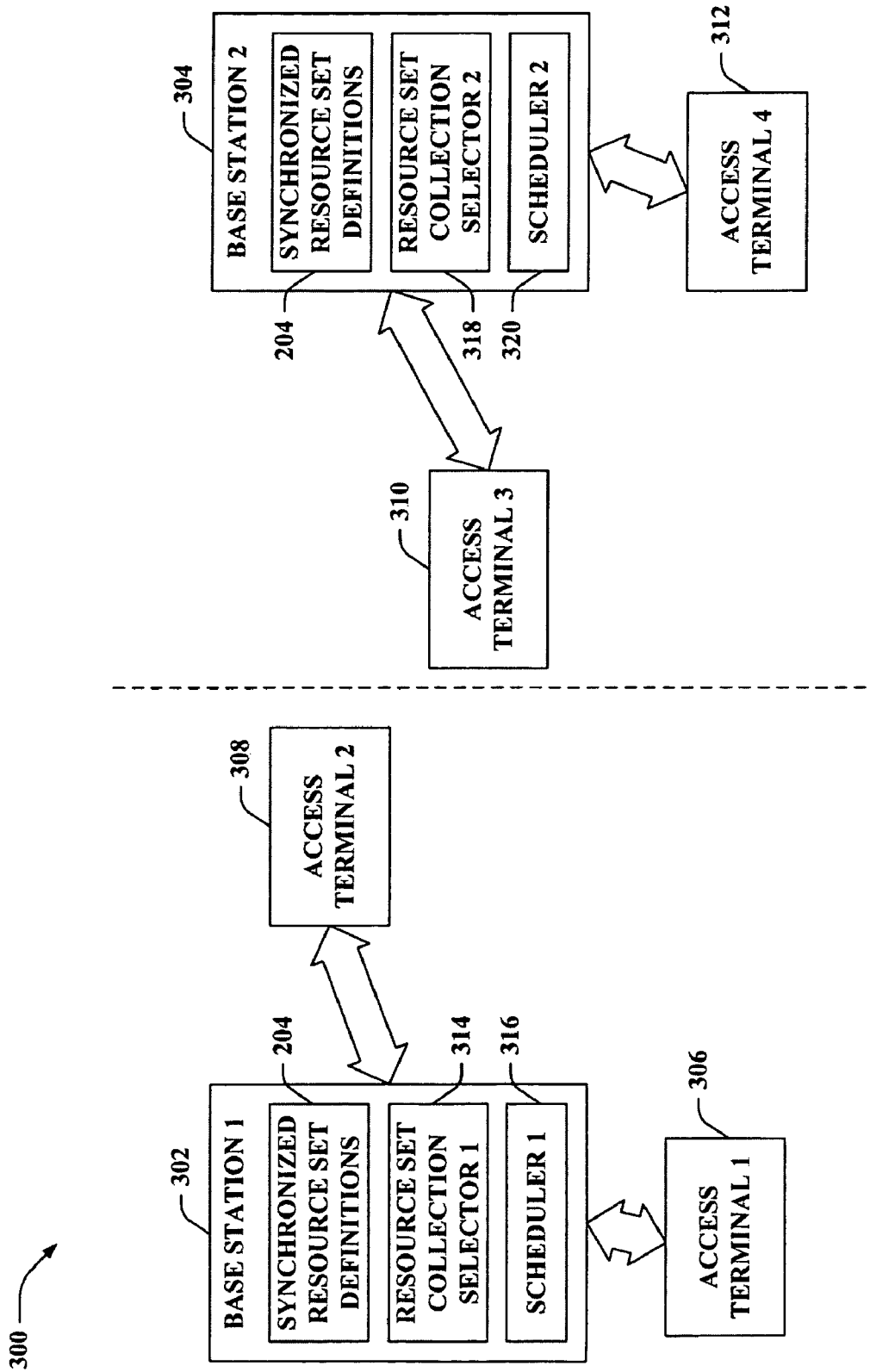
FIG. 3 is an illustration of an example system that employs adaptive distributed frequency planning in a wireless communication environment.

With reference to FIG. 3, illustrated is a system 300 that employs adaptive distributed frequency planning in a wireless communication environment. System 300 includes two base stations (e.g., base station 1 302 and base station 2 304), each of which can be substantially similar to base station 202 of FIG. 2. Further, each base station can communicate with two access terminals that can be positioned within respective coverage areas (e.g., access terminal 1 306 and access terminal 2 308 can be located within a coverage area associated with base station 1 302 and can each communicate with base station 1 302 via forward link and/or reverse link channel(s), access terminal 3 310 and access terminal 4 312 can be located within a coverage area associated with base station 2 304 and can each communicate with base station 2 304 via forward link and/or reverse link channel(s), . . . ). Thus, access terminal 1 306 and access terminal 2 308 can be served by base station 1 302, and access terminal 3 310 and access terminal 4 312 can be served by base station 2 304. Moreover, access terminals 306-312 can each transmit and/or receive information, signals, data, instructions, commands, bits, symbols, and the like. Although system 300 is depicted as including two base stations 302-304 and four access terminals 306-312, it is to be appreciated that system 300 can include substantially any number of base stations that can be substantially similar to base stations 302-304 and/or substantially any number of access terminals that can be substantially similar to access terminals 306-312.

Base station 1 302 can include synchronized resource set definitions 204, a resource set collection selector 1 314, and a scheduler 1 316, and base station 2 304 can include synchronized resource set definitions 204, a resource set collection selector 2 318, and a scheduler 2 320. It is to be appreciated that resource set collection selector 1 314 and resource set collection selector 2 318 can each be substantially similar to resource set collection selector 206 of FIG. 2, and scheduler 1 316 and scheduler 2 320 can each be substantially similar to scheduler 208 of FIG. 2. Moreover, base station 1 302 and base station 2 304 can have a common understand of synchronized resource set definitions 204.

As shown, cells associated with base stations 302-304 can have a common boundary. If the same collection of resource sets is used for both base stations 302-304, then significant amounts of interference can be yielded. For example, access terminal 2 308 and access terminal 3 310 can be within close proximity of each other. When base station 1 302 transmits to access terminal 2 308 using a particular resource set, access terminal 3 310 can experience significant interference on the particular resource set. Rather, base station 1 302 can schedule users that are within close proximity to base station 1 302 (e.g., access terminal 1 306, . . . ) with low transmit power on certain resource sets thereby granting these resource sets to be utilized by neighboring cells (e.g., base station 2 304, . . . ). Further, base station 1 302 can schedule users with high transmit power (e.g., positioned closer to a cell boundary such as access terminal 2 308, . . . ) on other resource sets assuming that users being served by neighboring base stations (e.g., base station 2 304, . . . ) will not be scheduled on such resource sets or users with low transmit power within close proximity of these neighboring base stations will be scheduled. Hence, different resource sets can be selected for use and employed by disparate base stations 302-304, thereby allowing allocation of a given resource set in connection with base station 1 302 while such given resource set can be inhibited from use or moderately used in connection with base station 2 304 (e.g., since each resource set maps to the same physical resources across system 300 as specified in synchronized resource set definitions 204).

According to an example, base stations 302-304 (e.g., resource set collection selectors 314 and 318, . . . ) can employ adaptive distributed frequency planning based on a forward link metric. Following this example, each resource set collection selector 314, 318 can make use of long-term carrier to interference (C/I) reports to decide on resource sets to be added and/or dropped from respective collections of resource sets. For instance, access terminals 306-308 can generate and send resource specific Channel Quality Indicator (resource specific CQI) reports (e.g., Vectorized Channel Quality Indicator (VCQI) reports, . . . ) to base station 1 302 that describe respective long-term channel qualities observed at each access terminal 306-308 for a particular resource set. Similarly, access terminals 310-312 can generate and send resource specific CQI reports to base station 2 304 that describe respective channel qualities observed at each access terminal 310-312 for a particular resource set. Resource specific CQI reports can be utilized as opposed to regular Channel Quality Indicator (CQI) reports, which are typically not resource set specific. Rather, resource specific CQI reports are resource set specific, and thus, access terminals 306-312 can feedback resource specific CQI reports to respective base stations 302-304 and the resource specific CQI reports can be utilized by resource set collection selectors 314, 318 to tailor formation of respective collections of resource sets.

Following the foregoing example that leverages the forward link metric, a possible criterion employed by resource set collection selectors 314, 318 to adaptively choose resource sets for a collection can be to maximize a harmonic mean C/I value; however, it is to be appreciated that the claimed subject matter is not limited to use of maximization of the harmonic mean C/I value. Maximization of the harmonic mean C/I value can be used to make decisions concerning which resource sets to use for forward link scheduling and reverse link scheduling. For instance, this forward link metric can be used for forward link fractional frequency reuse (FFR) (e.g., scheduling on the forward link, . . . ). Accordingly, harmonic mean C/I over a resource set reflects a C/I value achieved by an ensemble of access terminals scheduled on this resource set when a base station targets the same C/I value for all these access terminals. According to an illustration, when traffic such as Voice over Internet Protocol (VoIP), fixed service requirement traffic, or the like is scheduled, power control can be effectuated to yield a given rate at a particular C/I value, where the harmonic mean C/I can describe this particular C/I value. As such, the harmonic mean C/I is dominated by the worst C/I seen on this resource set; hence, the harmonic mean C/I can be a good metric under a minimum rate requirement scenario. By way of further illustration, the forward link metric can be used for reverse link FFR (e.g., scheduling on the reverse link, . . . ). Pursuant to this illustration, harmonic mean C/I over a resource set reflects the total sum of interference by all access terminals scheduled on this resource set to all non-serving base stations when access terminals are power controlled to a fixed target at the serving base station. Hence, the harmonic mean C/I, when used for reverse link FFR, can provide a rough estimate of an amount of interference users will contribute to neighboring base station(s), cell(s), etc. within a network on average if scheduled on a given resource set. For instance, if the harmonic mean C/I over the forward link is bad for a particular resource set, then if that resource set were to be selected for use it would generate too much interference to the neighbors, which can be a poor use of the particular resource set from a network perspective. Thus, when used for reverse link FFR, the harmonic mean C/I can provide a good measure of the total reverse link traffic interference across the network.

In accordance with an example employing the forward link metric that leverages harmonic mean C/I, a base station can compute a long-term harmonic mean C/I value for each resource set averaged over access terminals scheduled on this resource set. Further, for resource sets not currently in use (e.g., resource sets not currently included in a collection associated with the base station, . . . ), the base station can compute the long-term harmonic mean C/I value for each resource set averaged over access terminals that would be scheduled if a particular resource set were available. Moreover, based upon the foregoing analysis, the base station can replace resource sets in the collection with low harmonic mean C/I with resource sets previously excluded from the collection with high mean C/I (e.g., the resource set in the collection with the lowest harmonic mean C/I can be replaced in the collection by the resource set previously not in the collection that has the highest harmonic mean C/I, . . . ). Further, frequency of such replacement can be controlled (e.g., a minimum amount of time between resource set replacements can be preset, adaptively determined, . . . ).

According to another example, base stations 302-304 (e.g., resource set collection selectors 314 and 318, . . . ) can employ adaptive distributed frequency planning based on a reverse link metric. Each resource set collection selector 314, 318 can make use of ChanDiff reports and/or indications of Forward Link Other Sector Interference Channel (F-OSICH) activity to decide on resource sets to be added and/or dropped from respective collections. ChanDiff is defined as the difference in path loss between a serving sector and a next strongest sector; thus, ChanDiff can provide an indication of the amount of interference an access terminal is contributing to a closest neighbor.

For instance, access terminals can include in-band reports of the latest transmit Power Spectral Density (PSD) level in the case of PSD change, which can indicate the presence/absence of fast interference management activity (e.g., Forward Link Fast Other Sector Interference Channel (F-FOSICH) activity, . . . ) by non-serving base station(s) on the resources assigned to the access terminal. Among the access terminals that indicate change in transmit PSD, a base station can select the access terminal with the minimum value of the reported ChanDiff. Further, the access terminals can report ChanDiff corresponding to the closest reverse link neighbor. Moreover, the base station (e.g., resource set collection selector 314, 318, . . . ) can drop one resource set that has been assigned to the so-selected access terminal. In exchange for the dropped resource set, the base station (e.g., resource set collection selector 314, 318, . . . ) can grab a resource set that shows a minimum interference (e.g., Interference over Thermal (IoT), . . . ) level among all resource sets currently not in use by the base station.

According to another example, ChanDiff can be computed by base stations 302-304 (e.g., resource set collection selectors 314, 318, . . . ). For instance, ChanDiff can be generated by a base station based on pilot reports obtained from access terminals. Further, ChanDiff with respect to more than one neighbor, rather than just the closest neighbor, can be taken into account when ChanDiff is determined by the base station based upon the pilot reports. Following this example, an equivalent of OSI information can be communicated between base stations (e.g., between base station 1 302 and base station 2 304, . . . ) over backhaul rather than based on feedback from access terminals. Thus, a base station can recognize, from among access terminals affected by OSI (e.g., as determined from the OSI information obtained over the backhaul, . . . ), an access terminal with a minimum value of ChanDiff. Moreover, a resource set that has been assigned to this access terminal with the minimum value of ChanDiff can be dropped. In exchange for the dropped resource set, the base station (e.g., resource set collection selector 314, 318, . . . ) can add a resource set that shows a minimum interference level among all resource sets currently not in use by the base station.

Pursuant to the above example that utilizes the reverse link metric, forward link based distributed planning can minimize the sum of reverse link interference caused by a base station to other base stations on a given resource set. Moreover, reverse link planning that utilizes the aforementioned reverse link metric can help isolate dominant interferers.

Figure 4:
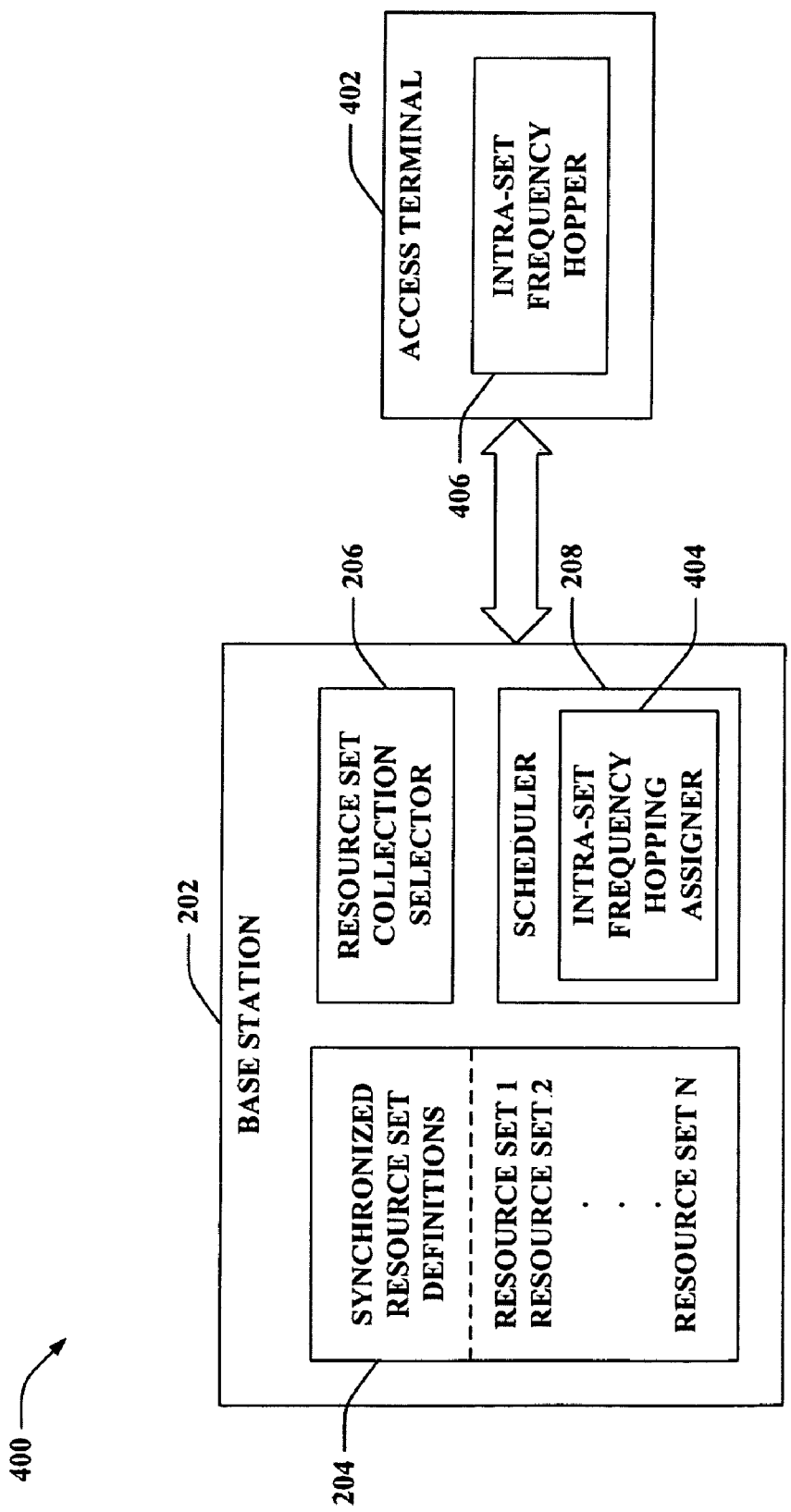
FIG. 4 is an illustration of an example system that employs frequency hopping within resource sets in a wireless communication environment.

Turning to FIG. 4, illustrated is a system 400 that employs frequency hopping within resource sets in a wireless communication environment. System 400 includes base station 202 and an access terminal 402 (e.g., access terminal 1 306 of FIG. 3, access terminal 2 308 of FIG. 3, access terminal 3 310 of FIG. 3, access terminal 4 312 of FIG. 3, . . . ). Although one base station and one access terminal are depicted, it is to be appreciated that system 400 can include substantially any number of base stations similar to base station 202 and/or substantially any number of access terminals similar to access terminal 402.

Base station 202 can include synchronized resource set definitions 204, resource set collection selector 206, and scheduler 208 as described herein. For instance, scheduler 208 can schedule access terminal 402 to employ a resource set from a collection assembled by resource set collection selector 206 for forward link and/or reverse link communication. Scheduler 208 can further include an intra-set frequency hopping assigner 404 that controls frequency hopping within the resource set scheduled to be used by access terminal 402. For instance, intra-set frequency hopping assigner 404 can generate, implement use of, disseminate information related to, etc. a base station specific hopping pattern (e.g., cell specific hopping pattern, sector specific hopping pattern, . . . ). Moreover, access terminal 402 can include an intra-set frequency hopper 406 that can utilize the base station specific hopping pattern yielded by intra-set hopping assigner 404.

Hopping patterns utilized in connection with system 400 can provide interference diversity. Moreover, the hopping patterns can be specific to a base station, sector, cell, or the like. Thus, by using different hopping patterns for disparate base stations, sectors, cells, etc., repeated interference at different time periods can be mitigated. In contrast, if the same hopping pattern is used between base stations, sectors, cells, etc., then collisions can persist over time.

Moreover, intra-set frequency hopping assigner 404 can control frequency hopping to be within a given resource set while inhibiting hopping between resources included in more than one resource set. A resource set is a collection of sub-zones (e.g., sub-bands, . . . ) on some interlaces. Further, a sub-zone is defined as a set of logical tones across a physical (PHY) frame. Accordingly, an assignment contiguous in logical space which is less than a size of a sub-zone can hop within a sub-zone. Moreover, logical space can be defined as the space of channel nodes. Moreover, sub zone hopping can be synchronized across base stations; thus, sets of access terminals assigned to the same sub-zone by different base stations can interfere with each other, while access terminals assigned to disparate sub-zone can be non-interfering.

Figure 5:
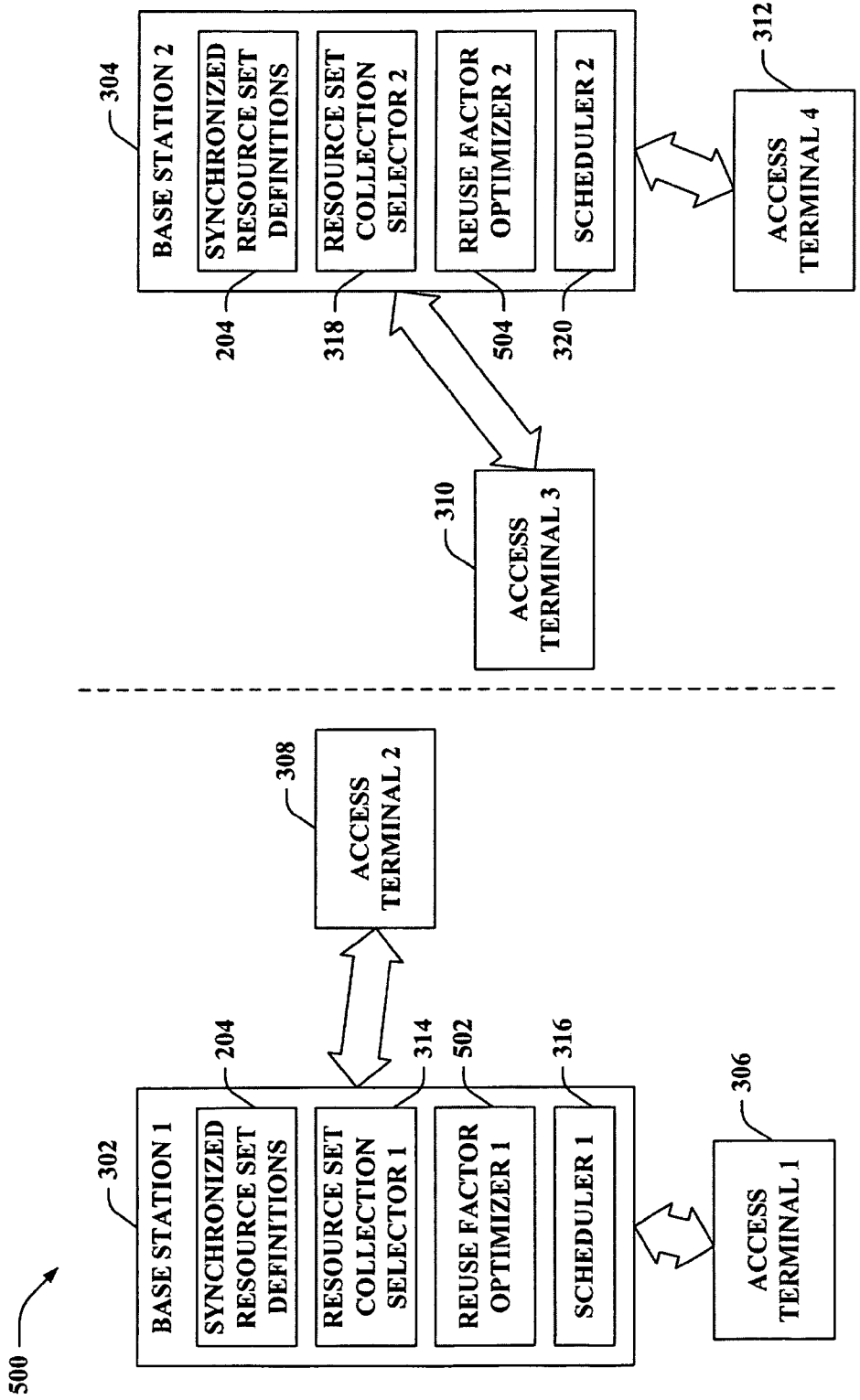
FIG. 5 is an illustration of an example system that adaptively chooses reuse factors in a distributed manner in a wireless communication environment.

With reference to FIG. 5, illustrated is a system 500 that adaptively chooses reuse factors in a distributed manner in a wireless communication environment. System 500 includes base station 1 302 and base station 2 304 as well as access terminals 306-312. Each base station 302-304 can include synchronized resource set definitions 204, a respective resource set collection selector 314, 318, and a respective scheduler 316. Moreover, each base station 302-304 can include a respective reuse factor optimizer (e.g., base station 1 302 includes reuse factor optimizer 1 502, base station 2 304 includes reuse factor optimizer 2 504, . . . ).

Each reuse factor optimizer 502-504 can select an optimal reuse factor to be utilized for its respective base station 302-304. Thus, reuse factor optimizer 1 502 can identify a first reuse factor to be employed by base station 1 302 (e.g., resource set collection selector 1 314, . . . ) and reuse factor optimizer 2 504 can determine a second reuse factor to be used by base station 2 304 (e.g., resource set collection selector 2 318, . . . ). Moreover, reuse factor optimizers 502-504 can adaptively choose respective reuse factors as a function of time.

An optimal reuse factor can depend on a number of aspects. For instance, reuse factors can depend upon the desired tradeoff between edge user performance and capacity reduction. Further, reuse factors can be based upon deployment topology and density as well as base station antenna properties. Moreover, the performance metric utilized can affect the optimal reuse factor.

According to an example, reuse factor optimizers 502-504 can employ a metric for the choice of reuse factor based upon a C/I distribution seen at access terminals served by neighboring base stations (e.g., reuse factor optimizer 1 502 can employ C/I related information obtained from access terminal 3 310 and access terminal 4 312, reuse factor optimizer 2 504 can utilize C/I related information obtained from access terminal 1 306 and access terminal 2 308, . . . ). Following this example, tail C/I can be used in medium-density and/or planned deployments. By way of further illustration, average median C/I can be used in dense unplanned deployments. In accordance with another example, a hybrid criterion can be used such that, for instance, a reuse factor can be lowered if an average/median C/I is below a first threshold or a tail C/I is below a second threshold.

Moreover, reuse factor optimizers 502-504 can utilize forward link resource specific CQI reports to optimize reuse factor selections. For instance, for every resource set, a base station (e.g., reuse factor optimizer 502, 504) can compute the lowest C/I value among a subset of non-served access terminals in the active set of this base station such that this resource set is the best resource set for all access terminals within the subset. The base station can compute C/I based on resource specific CQI reports from non-served access terminals in its active set. Moreover, the base station can drop a resource set if it is in use and the C/I metric is below a certain threshold, while the base station can add a resource set if it is not in use and the C/I metric is above a certain threshold.

It is to be appreciated that a substantially similar metric and threshold policy can be used consistently by disparate base stations in the network, since differences in thresholds could affect inter-base station fairness. Moreover, unplanned deployments can yield tight C/I distributions with low medians; thus, performance may not be too sensitive to bandwidth versus C/I tradeoff.

Figure 6:
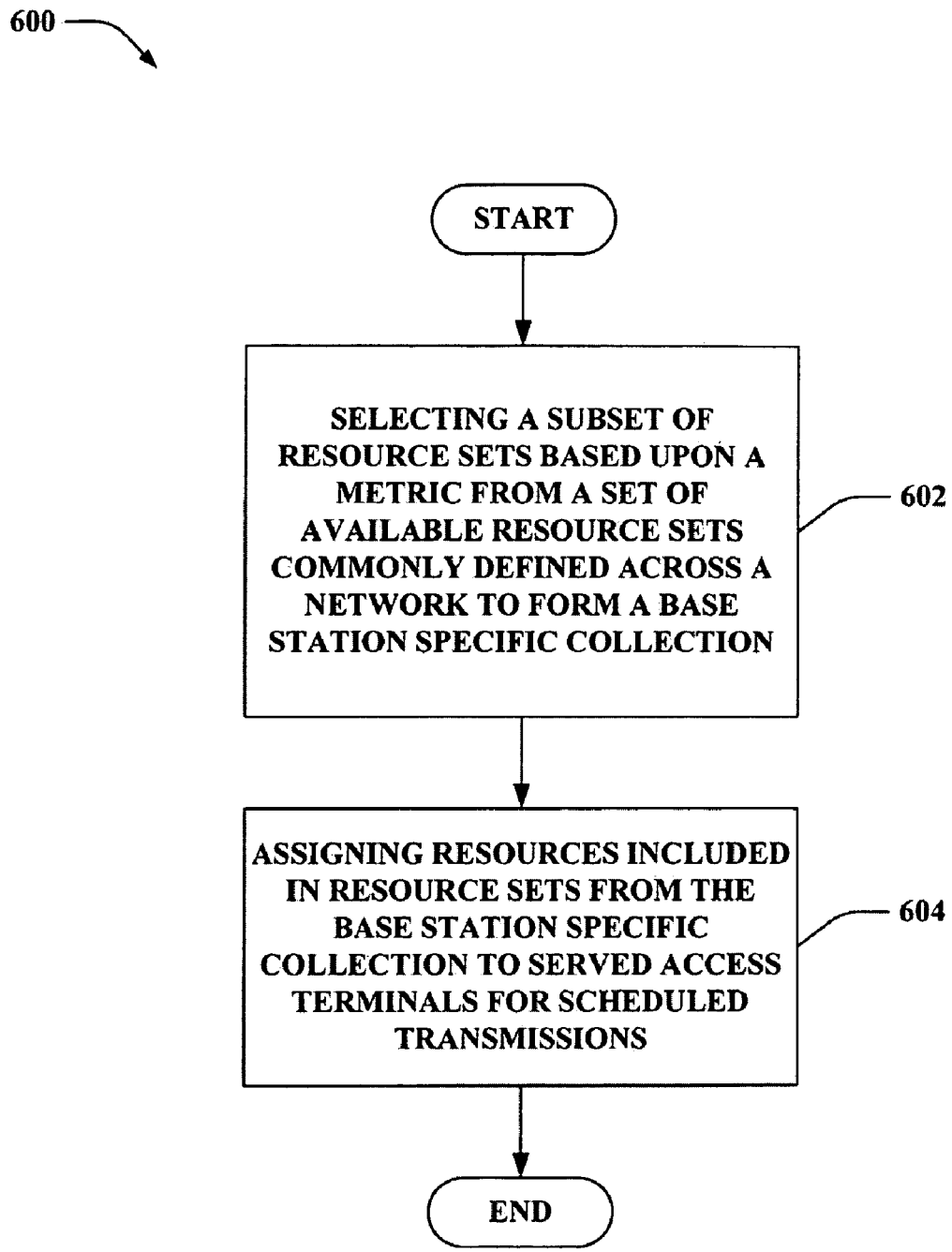
FIG. 6 is an illustration of an example methodology that facilitates distributed selecting of resource sets to use for user assignments in a wireless communication environment.
Figure 7:
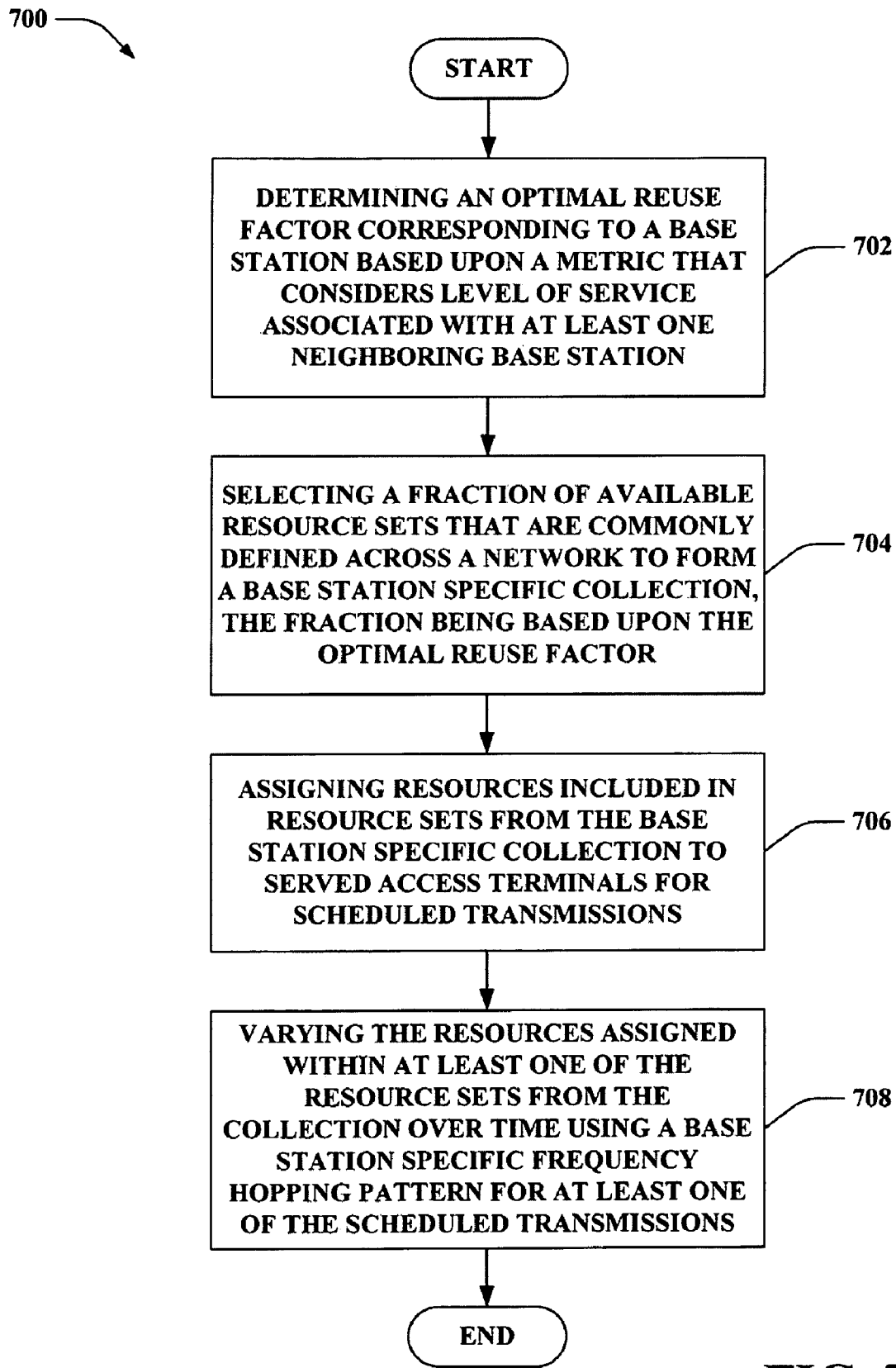
FIG. 7 is an illustration of an example methodology that facilitates employing distributed frequency planning in a wireless communication environment.

Referring to FIGS. 6-7, methodologies relating to adaptive distributed frequency planning in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that facilitates distributed selecting of resource sets to use for user assignments in a wireless communication environment. At 602, a subset of resource sets can be selected based upon a metric from a set of available resource sets commonly defined across a network to form a base station specific collection. Further, resource sets can be added and/or removed from the base station specific collection over time, and thus, the base station specific collection can be adaptive. Moreover, the metric can be a forward link metric and/or a reverse link metric (e.g., a forward link metric, a reverse link metric, a combination of forward and reverse link metrics, . . . ).

For example, when a forward link metric is utilized, resource specific Channel Quality Indicator (resource specific CQI) reports received from one or more access terminals can be employed to select the subset of resource sets that form the base station specific collection. Moreover, resource sets can be added and/or removed from the base station specific collection while employing a criterion that maximizes harmonic mean Carrier to Interference (C/I) values for forward link fractional frequency reuse or reverse link fractional frequency reuse. By way of illustration, a long-term harmonic mean C/I value can be determined for each resource set averaged over access terminals scheduled on such resource set. Following this illustration, resource set(s) with the highest long-term harmonic mean C/I value can be added to the base station specific collection. Further, the long-term harmonic mean C/I values can continue to be determined over time, which can allow a resource set with a lowest harmonic mean C/I value that is currently included in the base station specific collection to be replaced in the base station specific collection by a resource set with a highest harmonic mean C/I value that is currently excluded from the base station specific collection.

According to another example, a reverse link metric can be employed. Following this example, ChanDiff information (e.g., generated at a base station based upon pilot reports obtained from one or more access terminals, received from one or more access terminals as at least part of ChanDiff reports, . . . ) and/or information related to reverse link interference commands (e.g., obtained from one or more access terminals, received via a backhaul from one or more disparate base stations, . . . ) can be used to select the subset of resource sets that form the base station specific collection. The information related to reverse link interference commands can be F-OSICH activity; however, the claimed subject matter is not so limited. For instance, a particular access terminal with a minimum value of a reported ChanDiff can be selected from among a set of access terminals that indicate a change in transmit Power Spectral Density (PSD). Thereafter, a resource set assigned to the particular access terminal can be dropped from the base station specific collection, while a resource set that shows a minimum interference level among resource sets currently excluded from the base station specific collection can be added to the base station specific collection.

At 604, resources included in the resource set from the base station specific collection can be assigned to served access terminals for scheduled transmissions. For example, the resources can be allotted for use in connection with forward link transmissions and/or reverse link transmissions.

Turning to FIG. 7, illustrated is a methodology 700 that facilitates employing distributed frequency planning in a wireless communication environment. At 702, an optimal reuse factor corresponding to a base station can be determined based upon a metric that considers level of service associated with at least one neighboring base station. For instance, the optimal reuse factor can be determined based upon forward link resource specific CQI reports. Moreover, the metric for the choice of reuse factor can be C/I distribution seen at access terminals served by the at least one neighboring base station. By way of example, a lowest C/I value among a subset of non-served access terminals in an active set of a base station can be determined for each available resource set, where C/I values can be generated based upon resource specific CQI reports from the non-served access terminals in the active set of the base station. Following this example, the reuse factor can be decreased if a resource set is in use and the C/I metric is below a certain threshold, while the reuse factor can be increased if the resource set is not in use and the C/I metric is above a certain threshold.

According to another illustration, the optimal reuse factor can be determined based upon a criterion that considers a data rate served by the base station. With a given distribution of resource sets across base stations, it can be assumed that every base station can be optimized subject to a certain common criterion such as, for instance, a median or tail (e.g., X %) data rate. Under this assumption, a base station can compare its metric (e.g., tail data rate, median data rate, . . . ) to that of its neighbors. In the event the base station identifies that it is at an advantage, this base station can consider dropping a resource set. Further, if the base station determines that it is at a disadvantage, this base station can consider adding (e.g., grabbing, . . . ) a resource set. Moreover, the base station can calculate an anticipated change in its metric as well as anticipated change(s) in metric(s) of its neighbor(s) for every possible case of resource set exchange (e.g., base station drops one resource set if it is at an advantage, base station grabs one resource set if it is at a disadvantage, base station swaps a first resource set for a second resource set, . . . ). The base station can also decide on resource set exchange (e.g., drop, grab, swap, . . . ) based on the anticipated value of metrics of different base stations that result from this exchange. It can be noted, for instance, that grab/drop decisions can be unilateral while swap decisions can be accomplished based on inter-base station communication. Further, these decisions can be considered as distributed planning if grab/drop/swap decisions take place locally.

At 704, a fraction of available resource sets that are commonly defined across a network can be selected to form a base station specific collection. For instance, the fraction can be based upon the optimal reuse factor. At 706, resources included in resource sets from the base station specific collection can be assigned to served access terminals for scheduled transmissions.

At 708, the resources assigned within at least one of the resource sets from the collection can be varied over time using a base station specific hopping pattern for at least one of the scheduled transmissions. Moreover, each resource set can be a unit that maps to the same physical resources across a network or portion thereof. Further, within a resource set, different base stations across the network can employ different hopping patterns (e.g., respective intra-resource set frequency hopping pattern for each base station, . . . ).

It will be appreciated that, in accordance with one or more aspects described herein, inferences can be made regarding employing adaptive distributed frequency planning in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic— that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to determining resource sets to add and/or drop from a base station specific collection of resource sets. By way of further illustration, an inference can be made related to determining a level of service associated with a neighboring base station, which can be leveraged in connection with determining an optimal reuse factor. It will be appreciated that the foregoing examples are illustrative in nature and are not intended to limit the number of inferences that can be made or the manner in which such inferences are made in conjunction with the various embodiments and/or methods described herein.

Figure 8:
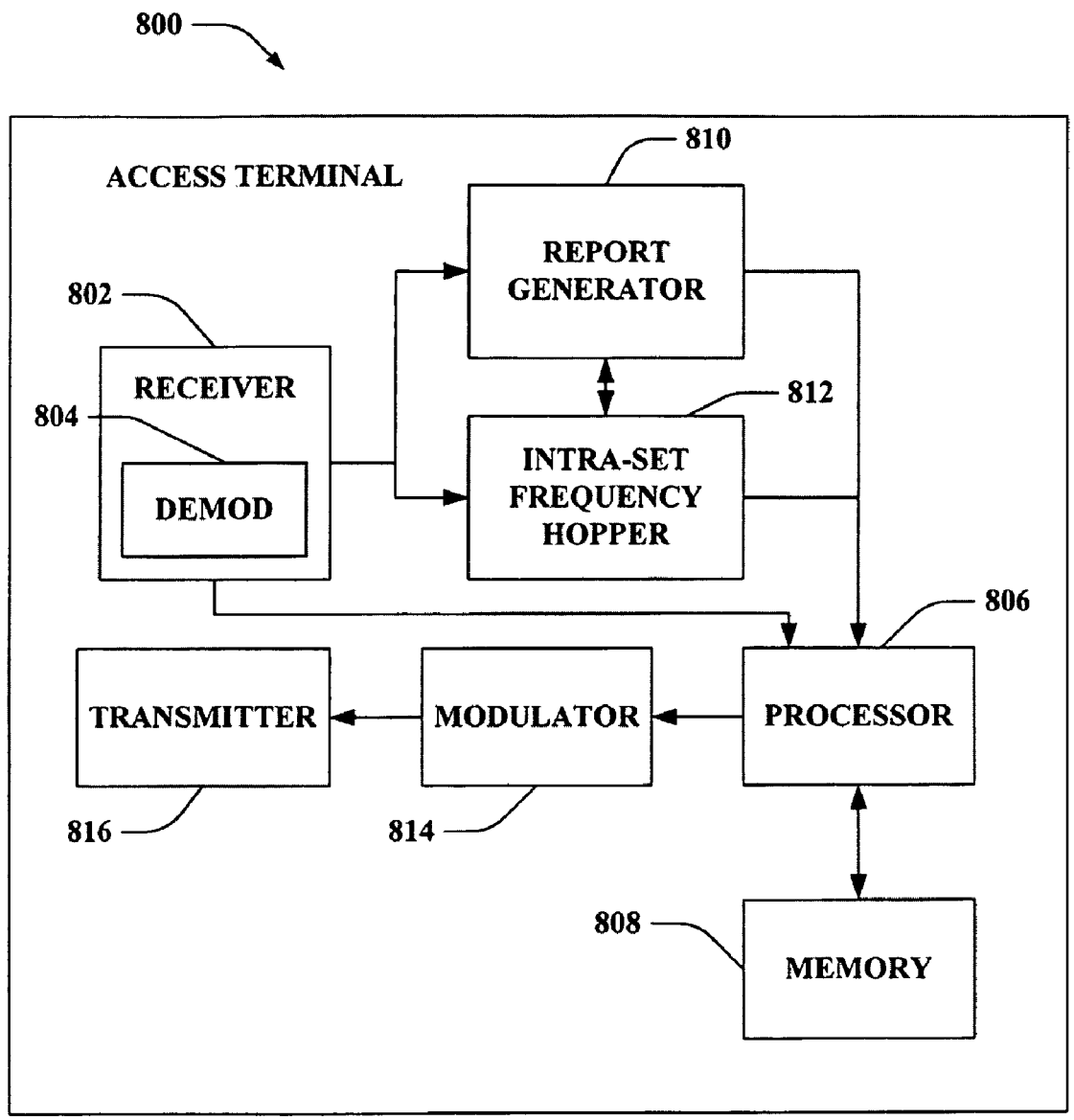
FIG. 8 is an illustration of an example access terminal that employs frequency hopping within a resource set in a wireless communication system.

FIG. 8 is an illustration of an access terminal 800 that employs frequency hopping within a resource set in a wireless communication system. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, and any other suitable information related to performing the various actions and functions set forth herein. Memory 808 can additionally store protocols and/or algorithms associated with generating reports for transmission to a base station and/or implementing a base station specific frequency hopping pattern.

It will be appreciated that the data store (e.g., memory 808) described herein can be either volatile: memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a report generator 810 and/or an intra-set frequency hopper 812. Report generator 810 can evaluate conditions, parameters, etc. associated with a forward link and/or a reverse link. Moreover, based upon such evaluation, report generator 810 can yield a report that can be sent to a base station. For instance, the report can be a resource specific CQI report. By way of further illustration, the report can be a ChanDiff report, an in-band report of transmit Power Spectral Density (PSD) levels, and the like. The reports can be employed by a corresponding base station to adaptively select resource sets for utilization, determine an optimal reuse factor, and the like as described herein. Further, intra-set frequency hopper 812 can be substantially similar to intra-set frequency hopper 406 of FIG. 4. For instance, intra-set frequency hopper 812 can enable access terminal 800 to implement a base station specific frequency hopping pattern. Moreover, frequency hopping as described herein can be constrained to be within resource sets rather than across resource sets. Thus, if access terminal 800 is assigned to receive data via a forward link using resources from a first resource set, intra-set frequency hopper 812 can implement a base station specific pattern that allows for frequency hopping using resources within the first resource set (rather than allowing frequency hopping to use resources from a disparate resource set). Access terminal 800 still further comprises a modulator 814 and a transmitter 816 that transmits the signal to, for instance, a base station, another access terminal, etc. Although depicted as being separate from the processor 806, it is to be appreciated that report generator 810, intra-set frequency hopper 812 and/or modulator 814 can be part of processor 806 or a number of processors (not shown).

Figure 9:
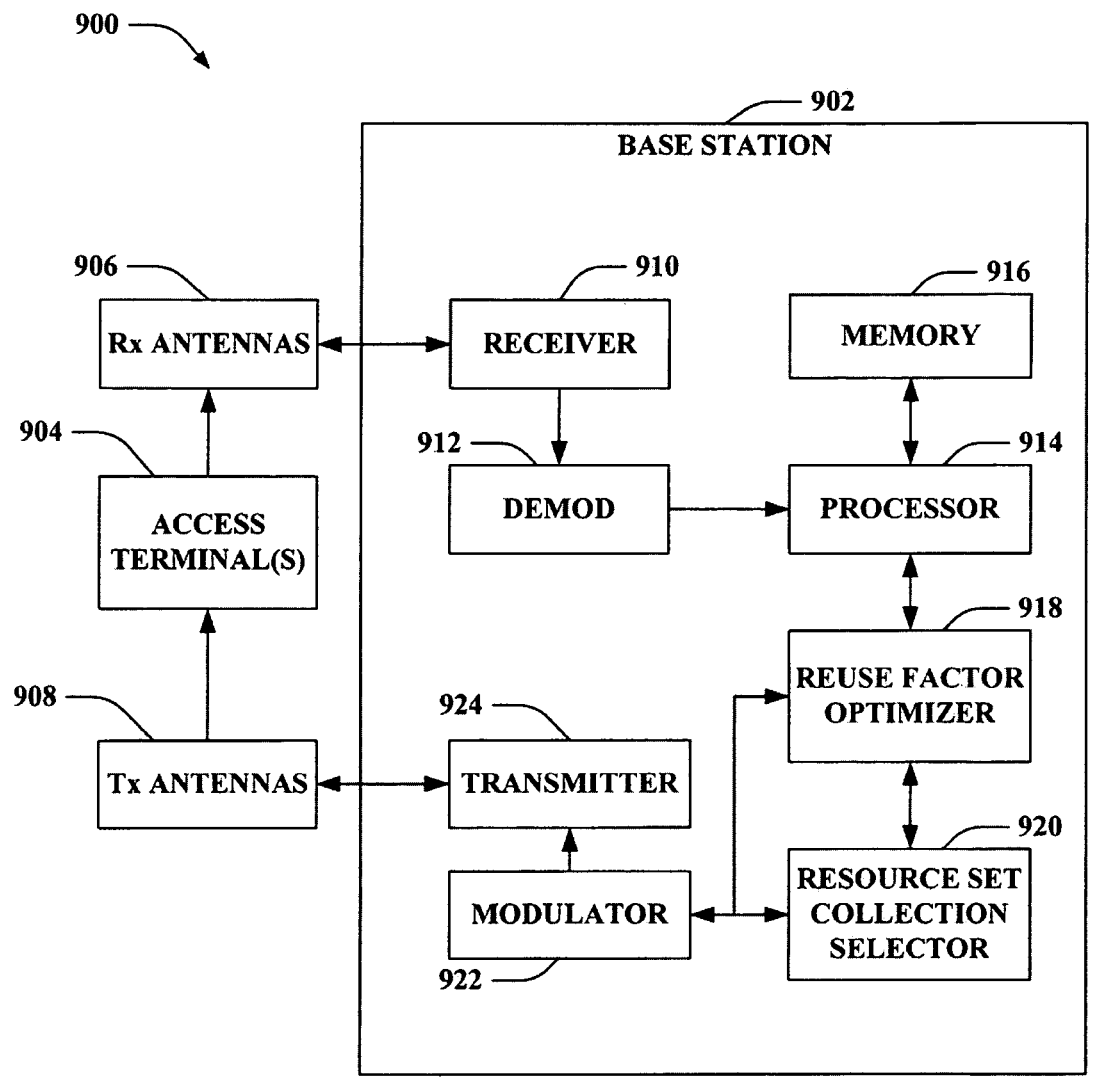
FIG. 9 is an illustration of an example system that facilitates adaptively determining a fraction of resource sets to use in a distributed fashion in a wireless communication environment.

FIG. 9 is an illustration of a system 900 that facilitates adaptively determining a fraction of resource sets to use in a distributed fashion in a wireless communication environment. System 900 comprises a base station 902 (e.g., access point, . . . ) with a receiver 910 that receives signal(s) from one or more access terminals 904 through a plurality of receive antennas 906, and a transmitter 924 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from access terminal(s) 904 (or a disparate base station (not shown)) and/or any other suitable information related to performing the various actions and functions set forth herein. For instance, memory 916 can include synchronized resource set definitions as described herein. Processor 914 is further coupled to a reuse factor optimizer 918 that determines a reuse factor to be employed by base station 902. Reuse factor optimizer 918 can consider levels of service provided by neighboring base station(s) when identifying the optimal reuse factor to use for base station 902, which can provide fairness considerations within a network that implements distributed frequency planning. Reuse factor optimizer 918 can be operatively coupled to a resource set collection selector 920 that adds and/or removes resource sets to a collection specific to base station 902. For instance, a fraction of an overall number of available resource sets (e.g., available network-wide as set forth in synchronized resource set definitions, . . . ) can be selected for inclusion in the collection based upon the optimal reuse factor determined by reuse factor optimizer 918. Moreover, the reuse factor and/or the resource sets selected for the collection specific to base station 902 can be adaptively determined over time. It is contemplated that reuse factor optimizer 918 can be substantially similar to reuse factor optimizer 1 502 and/or reuse factor optimizer 2 504 of FIG. 5. Further, it is to be appreciated that resource set collection selector 920 can be substantially similar to resource set collection selector 206 of FIG. 2. Further, reuse factor optimizer 918 and/or resource set collection selector 920 can provide data to be sent by each TX antenna 908 to a modulator 922. Modulator 922 can multiplex a frame for transmission by a transmitter 924 through antennas 908 to access terminal(s) 904. Although depicted as being separate from the processor 914, it is to be appreciated that reuse factor optimizer 918, resource set collection selector 920 and/or modulator 922 can be part of processor 914 or a number of processors (not shown).

Figure 10:
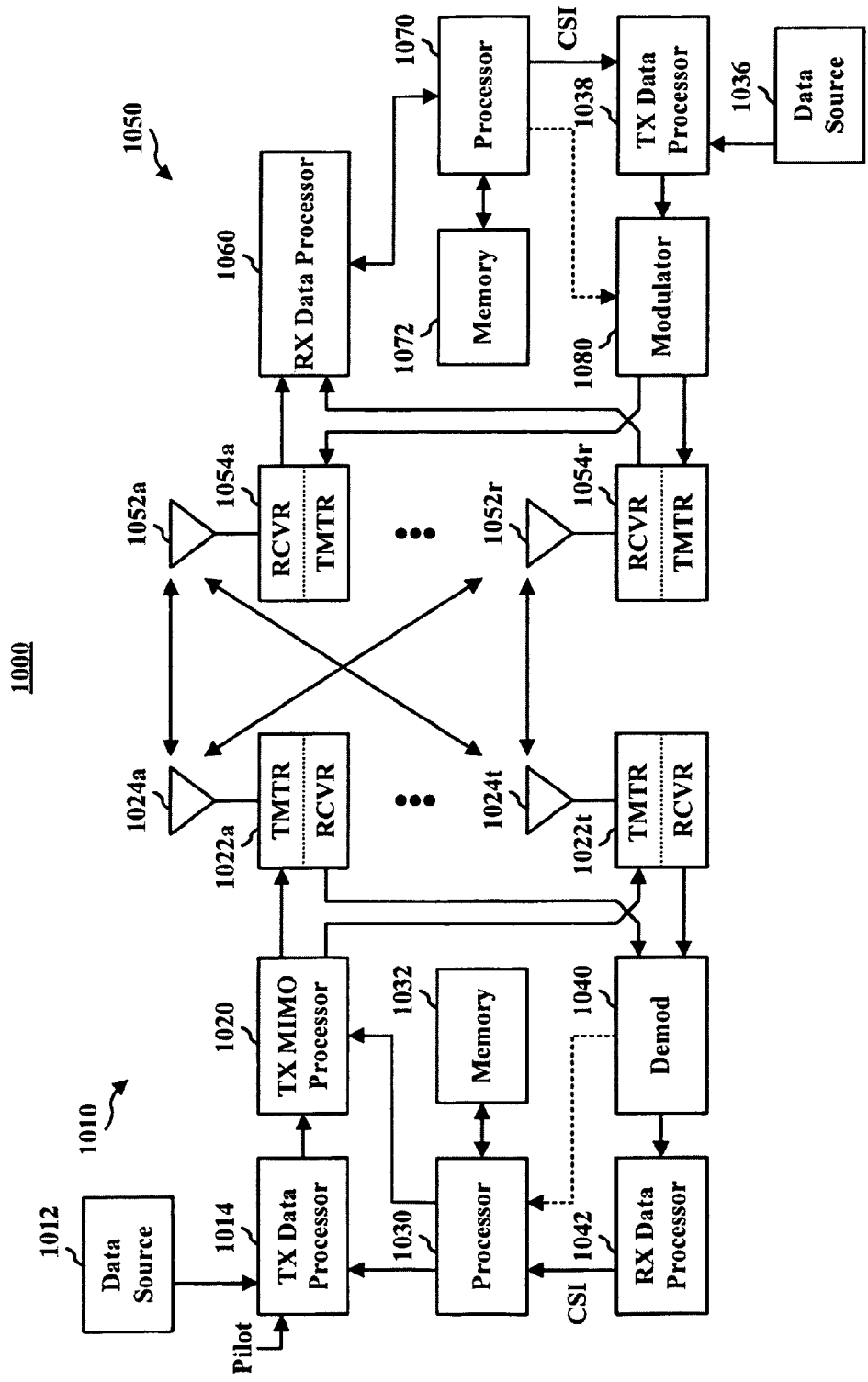
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-5, 8-9, and 11) and/or methods (FIGS. 6-7) described herein to facilitate wireless communication there between.

At base station 1010, traffic data for a number of data streams is provided from a data source 1012 to a transmit (TX) data-processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct. (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
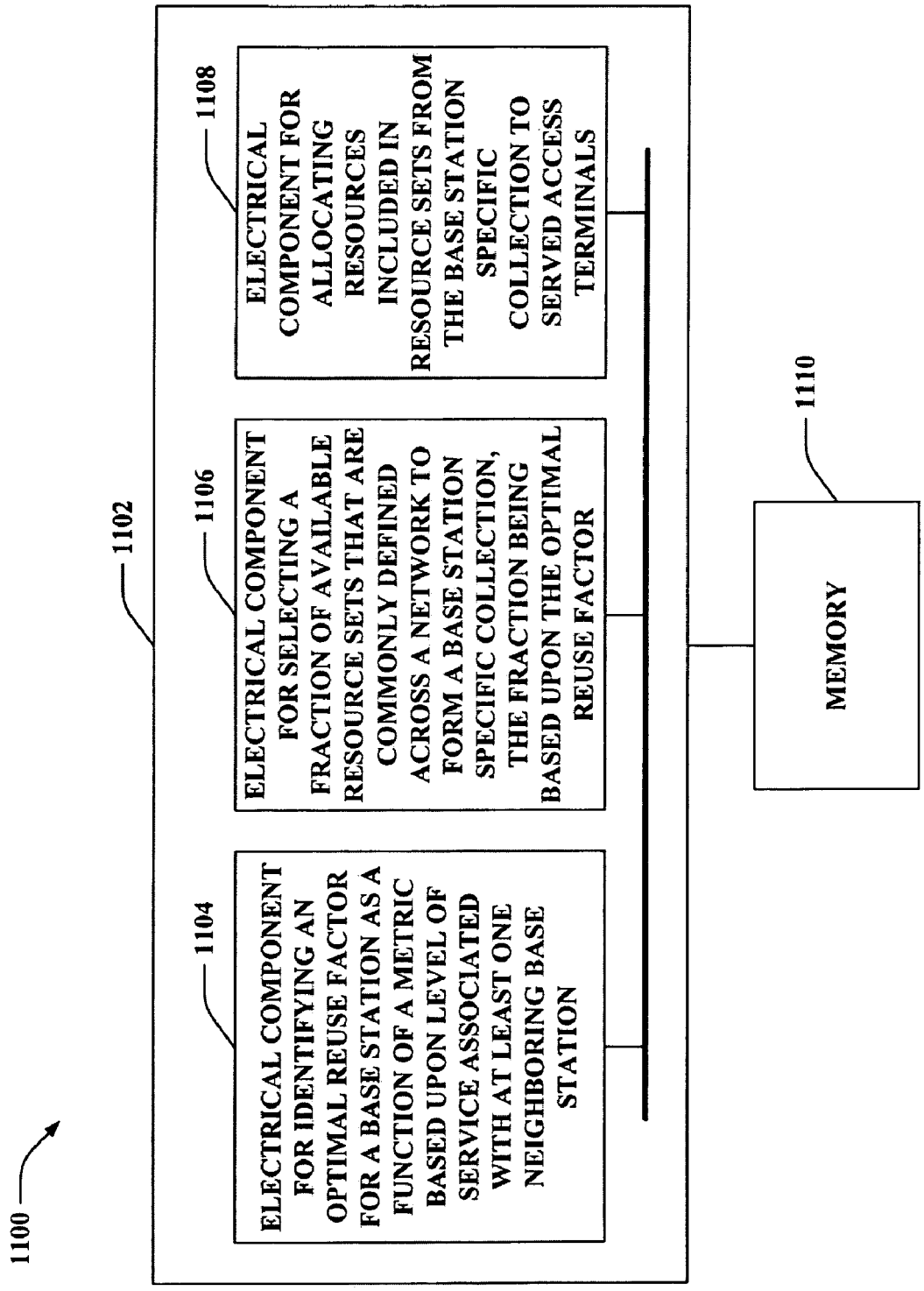
FIG. 11 is an illustration of an example system that enables adaptively selecting a subset of resource sets to utilize in a wireless communication environment.

With reference to FIG. 11, illustrated is a system 1100 that enables adaptively selecting a subset of resource sets to utilize in a wireless communication environment. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for identifying an optimal reuse factor for a base station as a function of a metric based upon level of service associated with at least one neighboring base station 1104. Further, logical grouping 1102 can include an electrical component for selecting a fraction of available resource sets that are commonly defined across a network to form a base station specific collection, where the fraction can be based upon the optimal reuse factor 1106. Moreover, logical grouping 1102 can include an electrical component for allocating resources included in resource sets from the base station specific collection to served access terminals 1108. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates distributed selecting of resource sets to use for user assignments in a wireless communication environment, comprising:
selecting a subset of resource sets based upon a first metric from a set of available resource sets commonly defined across a network to form a base station specific collection, wherein the subset of resource sets is selected by employing a criterion that maximizes harmonic mean Carrier to Interference (C/I) values for forward link fractional frequency reuse or reverse link fraction frequency reuse;
determining a long-term harmonic mean C/I value for each resource set averaged over access terminals scheduled on that resource set;
adding a resource set with a highest long-term harmonic mean C/I value to the base station specific collection; and
assigning resources included in resource sets from the base station specific collection to served access terminals for scheduled transmissions.

2. The method of claim 1, wherein the first metric is a forward link metric.

3. The method of claim 2, further comprising:
receiving resource specific Channel Quality Indicator (CQI) reports from one or more access terminals; and
selecting the subset of resource sets that form the base station specific collection based upon information in the resource specific CQI reports.

4. The method of claim 2, further comprising:
continuing to determine the long-term harmonic mean C/I values over time; and
replacing a first resource set with a lowest harmonic mean C/I value that is currently included in the base station specific collection with a second resource set with a highest harmonic mean C/I value that is currently excluded from the base station specific collection.

5. The method of claim 1, wherein the first metric is a reverse link metric.

6. The method of claim 5, further comprising selecting the subset of resource sets that form the base station specific collection based upon at least one of ChanDiff information or information related to reverse link interference commands.

7. The method of claim 6, further comprising:
generating the ChanDiff information based upon pilot reports obtained from one or more access terminals; and
obtaining the information related to the reverse link interference commands via a backhaul from one or more disparate base stations.

8. The method of claim 6, further comprising:
receiving the ChanDiff information from one or more access terminals as part of ChanDiff reports; and
receiving the information related to the reverse link interference commands from the one or more access terminals.

9. The method of claim 5, further comprising:
identifying a particular access terminal with a minimum value of a reported ChanDiff from among a set of access terminals that indicate a change in transmit Power Spectral Density (PSD);
dropping a first resource set assigned to the particular access terminal from the base station specific collection;
recognizing a second resource set with a minimum interference level among resource sets currently excluded from the base station specific collection; and
adding the second resource set to the base station specific collection.

10. The method of claim 1, wherein the first metric is a combination of forward and reverse link metrics.

11. The method of claim 1, further comprising determining an optimal reuse factor corresponding to a base station based upon a second metric that considers level of service associated with at least one neighboring base station.

12. The method of claim 11, further comprising selecting a fraction of available resource sets to form the base station specific collection, the fraction being based upon the optimal reuse factor.

13. The method of claim 11, determining the optimal reuse factor based upon forward link resource specific CQI reports.

14. The method of claim 11, wherein the second metric used for determining the optimal reuse factor is C/I distribution seen at access terminals served by the at least one neighboring base station.

15. The method of claim 11, further comprising:
generating C/I values based upon resource specific CQI reports from non-served access terminals in an active set of a base station;
determining a lowest C/I value among a subset of the non-served access terminals in the active set of the base station for each available resource set;
decreasing the optimal reuse factor when a resource set is in use and the C/I value is below a given threshold; and
increasing the optimal reuse factor when a resource set is not in use and the C/I value is above the given threshold.

16. The method of claim 11, wherein the second metric used for determining the optimal reuse factor is based upon a criterion that considers a data rate served, the method further comprising:
assuming that each base station is optimized subject to a common data rate;
comparing a data rate of a base station to data rates of neighboring base stations;
determining an anticipated change in the data rate of the base station and anticipated changes in the data rates of the neighboring base stations for possible resource set exchanges;
dropping a resource set when the base station is determined to be advantaged based upon the comparison and the anticipated changes in the data rates of the base station and the neighboring base stations; and
grabbing a resource set when the base station is determined to be disadvantaged based upon the comparison and the anticipated changes in the data rates of the base station and the neighboring base stations.

17. The method of claim 1, further comprising varying the resources assigned within at least one of the resource sets from the collection over time using a base station specific frequency hopping pattern for at least one of the scheduled transmissions.

18. A wireless communications apparatus, comprising:
a memory that retains instructions related to:
selecting a subset of resource sets based upon a first metric from a set of available resource sets commonly defined across a network to form a base station specific collection, wherein the subset of resource sets is selected by employing a criterion that maximizes harmonic mean Carrier to Interference (C/I) values for forward link fractional frequency reuse or reverse link fraction frequency reuse;
determining a long-term harmonic mean C/I value for each resource set averaged over access terminals scheduled on that resource set;
adding a resource set with a highest long-term harmonic mean C/I value to the base station specific collection;
assigning resources included in resource sets from the base station specific collection to served access terminals for scheduled transmissions; and
a processor, coupled to the memory, configured to execute the instructions retained in the memory.

19. The wireless communications apparatus of claim 18, wherein the first metric is a forward link metric.

20. The wireless communications apparatus of claim 19, wherein the memory further retains instruction related to receiving resource specific CQI reports from one or more access terminals and choosing the subset of resource sets that form the base station specific collection based upon information in the resource specific CQI reports.

21. The wireless communications apparatus of claim 18, wherein the memory further retains instruction related to:
continuing to determine the long-term harmonic mean C/I values over time; and
replacing a first resource set with a lowest harmonic mean C/I value that is currently included in the base station specific collection with a second resource set with a highest harmonic mean C/I value that is currently excluded from the base station specific collection.

22. The wireless communications apparatus of claim 18, wherein the first metric is a reverse link metric.

23. The wireless communications apparatus of claim 22, wherein the memory further retains instruction related to:
choosing the subset of resource sets that form the base station specific collection based upon least one of ChanDiff information or information related to reverse link interference commands.

24. The wireless communications apparatus of claim 22, wherein the memory further retains instruction related to:
identifying a particular access terminal with a minimum value of a reported ChanDiff from among a set of access terminals that indicate a change in transmit Power Spectral Density (PSD);
dropping a first resource set assigned to the particular access terminal from the base station specific collection;
recognizing a second resource set with a minimum interference level among resource sets currently excluded from the base station specific collection; and
adding the second resource set to the base station specific collection.

25. The wireless communications apparatus of claim 18, wherein the first metric is a combination of forward and reverse link metrics.

26. The wireless communications apparatus of claim 18, wherein the memory further retains instruction related to:
determining an optimal reuse factor corresponding to a base station based upon a second metric that considers level of service associated with at least one neighboring base station and choosing a fraction of available resource sets to form the base station specific collection, the fraction being based upon the optimal reuse factor.

27. The wireless communications apparatus of claim 26, wherein the memory further retains instruction related to:
determining the optimal reuse factor based upon forward link resource specific CQI reports obtained from access terminals.

28. The wireless communications apparatus of claim 26, wherein the second metric used for determining the optimal reuse factor is C/I distribution seen at access terminals served by the at least one neighboring base station.

29. The wireless communications apparatus of claim 26, wherein the memory further retains instruction related to:
generating C/I values based upon resource specific CQI reports from non-served access terminals in an active set of a base station;
determining a lowest C/I value among a subset of the non-served access terminals in the active set of the base station for each available resource set;
decreasing the optimal reuse factor when a resource set is in use and the C/I value is below a given threshold; and
increasing the optimal reuse factor when a resource set is not in use and the C/I value is above the given threshold.

30. The wireless communications apparatus of claim 26, wherein the second metric used for determining the optimal reuse factor is based upon a criterion that considers a data rate served that assumes each base station is optimized subject to a common data rate, wherein the memory further retains instructions related to:
comparing a data rate of a base station to data rates of neighboring base stations;

determining an anticipated change in the data rate of the base station and anticipated changes in the data rates of the neighboring base stations for possible resource set exchanges;

dropping a resource set when the base station is determined to be advantaged based upon the comparison and the anticipated changes in the data rates of the base station and the neighboring base stations; and grabbing a resource set when the base station is determined to be disadvantaged based upon the comparison and the anticipated changes in the data rates of the base station and the neighboring base stations.

31. The wireless communications apparatus of claim 18, wherein the memory further retains instruction related to:

varying the resources allocated within at least one of the resource sets from the collection over time using a base station specific frequency hopping pattern for at least one of the scheduled transmissions.

32. An apparatus, comprising:

means for selecting a subset of resource sets based upon a first metric from a set of available resource sets commonly defined across a network to form a base station specific collection, wherein the subset of resource sets is selected by employing a criterion that maximizes harmonic mean Carrier to Interference (C/I) values for forward link fractional frequency reuse or reverse link fraction frequency reuse;

means for determining a long-term harmonic mean C/I value for each resource set averaged over access terminals scheduled on that resource set;

means for adding a resource set with a highest long-term harmonic mean C/I value to the base station specific collection; and means for assigning resources included in resource sets from the base station specific collection to served access terminals for scheduled transmissions.

33. The apparatus of claim 32, wherein the first metric is a forward link metric.

34. The apparatus of claim 33, further comprising:

means for receiving resource specific Channel Quality Indicator (CQI) reports from one or more access terminals; and means for selecting the subset of resource sets that form the base station specific collection based upon information in the resource specific CQI reports.

35. A computer program product for facilitating distributed selection of resource sets to use for user assignments in a wireless communication environment, comprising:

a computer-readable storage medium comprising:

code for causing a computer to select a subset of resource sets based upon a first metric from a set of available resource sets commonly defined across a network to form a base station specific collection, wherein the subset of resource sets is selected by employing a criterion that maximizes harmonic mean Carrier to Interference (C/I) values for forward link fractional frequency reuse or reverse link fraction frequency reuse;

code for causing the computer to determine a long-term harmonic mean C/I value for each resource set averaged over access terminals scheduled on that resource set;

code for causing the computer to add a resource set with a highest long-term harmonic mean C/I value to the base station specific collection; and code for causing the computer to assign resources included in resource sets from the base station specific collection to served access terminals for scheduled transmissions.

36. The computer program product of claim 35, wherein the first metric is a forward link metric.

37. The computer program product of claim 36, further comprising:

code for causing the computer to receive resource specific Channel Quality Indicator (CQI) reports from one or more access terminals; and code for causing the computer to select the subset of resource sets that form the base station specific collection based upon information in the resource specific CQI reports.

38. At least one processor configured for facilitating distributed selection of resource sets to use for user assignments in a wireless communication environment, comprising:

a first module for selecting a subset of resource sets based upon a first metric from a set of available resource sets commonly defined across a network to form a base station specific collection, wherein the subset of resource sets is selected by employing a criterion that maximizes harmonic mean Carrier to Interference (C/I) values for forward link fractional frequency reuse or reverse link fraction frequency reuse;

a second module for determining a long-term harmonic mean C/I value for each resource set averaged over access terminals scheduled on that resource set;

a third module for adding a resource set with a highest long-term harmonic mean C/I value to the base station specific collection; and a fourth module for assigning resources included in resource sets from the base station specific collection to served access terminals for scheduled transmissions.

39. The at least one processor of claim 38, wherein the first metric is a forward link metric.

40. The at least one processor of claim 39, further comprising:

a fifth module for receiving resource specific Channel Quality Indicator (CQI) reports from one or more access terminals; and a sixth module for selecting the subset of resource sets that form the base station specific collection based upon information in the resource specific CQI reports.

41. A method that facilitates distributed selecting of resource sets to use for user assignments in a wireless communication environment, comprising:

selecting a subset of resource sets based upon a first metric from a set of available resource sets commonly defined across a network to form a base station specific collection;

identifying a particular access terminal with a minimum value of a reported ChanDiff from among a set of access terminals that indicate a change in transmit Power Spectral Density (PSD);

dropping a first resource set assigned to the particular access terminal from the base station specific collection;

recognizing a second resource set with a minimum interference level among resource sets currently excluded from the base station specific collection;

adding the second resource set to the base station specific collection; and assigning resources included in resource sets from the base station specific collection to served access terminals for scheduled transmissions.

42. A wireless communications apparatus, comprising:

a memory that retains instructions related to:

selecting a subset of resource sets based upon a first metric from a set of available resource sets commonly defined across a network to form a base station specific collection;

identifying a particular access terminal with a minimum value of a reported ChanDiff from among a set of access terminals that indicate a change in transmit Power Spectral Density (PSD);
dropping a first resource set assigned to the particular access terminal from the base station specific collection;
recognizing a second resource set with a minimum interference level among resource sets currently excluded from the base station specific collection;
adding the second resource set to the base station specific collection;
assigning resources included in resource sets from the base station specific collection to served access terminals for scheduled transmissions;
a processor, coupled to the memory, configured to execute the instructions retained in the memory.

43. An apparatus, comprising:
means for selecting a subset of resource sets based upon a first metric from a set of available resource sets commonly defined across a network to form a base station specific collection;
means for identifying a particular access terminal with a minimum value of a reported ChanDiff from among a set of access terminals that indicate a change in transmit Power Spectral Density (PSD);
means for dropping a first resource set assigned to the particular access terminal from the base station specific collection;
means for recognizing a second resource set with a minimum interference level among resource sets currently excluded from the base station specific collection;
means for adding the second resource set to the base station specific collection; and
means for assigning resources included in resource sets from the base station specific collection to served access terminals for scheduled transmissions.

44. A computer program product for facilitating distributed selection of resource sets to use for user assignments in a wireless communication environment, comprising:
a computer-readable storage medium comprising:
code for causing a computer to select a subset of resource sets based upon a first metric from a set of available resource sets commonly defined across a network to form a base station specific collection;
code for causing the computer to identify a particular access terminal with a minimum value of a reported ChanDiff from among a set of access terminals that indicate a change in transmit Power Spectral Density (PSD);
code for causing the computer to drop a first resource set assigned to the particular access terminal from the base station specific collection;
code for causing the computer to recognize a second resource set with a minimum interference level among resource sets currently excluded from the base station specific collection;
code for causing the computer to add the second resource set to the base station specific collection; and
code for causing the computer to assign resources included in resource sets from the base station specific collection to served access terminals for scheduled transmissions.

45. At least one processor configured for facilitating distributed selection of resource sets to use for user assignments in a wireless communication environment, comprising:
a first module for selecting a subset of resource sets based upon a first metric from a set of available resource sets commonly defined across a network to form a base station specific collection;
a second module for identifying a particular access terminal with a minimum value of a reported ChanDiff from among a set of access terminals that indicate a change in transmit Power Spectral Density (PSD);
a third module for dropping a first resource set assigned to the particular access terminal from the base station specific collection;
a fourth module for recognizing a second resource set with a minimum interference level among resource sets currently excluded from the base station specific collection;
a fifth module for adding the second resource set to the base station specific collection; and
a sixth module for assigning resources included in resource sets from the base station specific collection to served access terminals for scheduled transmissions.

46. A method that facilitates distributed selecting of resource sets to use for user assignments in a wireless communication environment, comprising:
selecting a subset of resource sets based upon a first metric from a set of available resource sets commonly defined across a network to form a base station specific collection;
determining an optimal reuse factor corresponding to a base station based upon a second metric that considers level of service associated with at least one neighboring base station;
generating C/I values based upon resource specific CQI reports from non-served access terminals in an active set of a base station;
determining a lowest C/I value among a subset of the non-served access terminals in the active set of the base station for each available resource set;
decreasing the optimal reuse factor when a resource set is in use and the C/I value is below a given threshold;
increasing the optimal reuse factor when a resource set is not in use and the C/I value is above the given threshold; and
assigning resources included in resource sets from the base station specific collection to served access terminals for scheduled transmissions.

47. A wireless communications apparatus, comprising:
a memory that retains instructions related to:
selecting a subset of resource sets based upon a first metric from a set of available resource sets commonly defined across a network to form a base station specific collection;
determining an optimal reuse factor corresponding to a base station based upon a second metric that considers level of service associated with at least one neighboring base station;
generating C/I values based upon resource specific CQI reports from non-served access terminals in an active set of a base station;
determining a lowest C/I value among a subset of the non-served access terminals in the active set of the base station for each available resource set;
decreasing the optimal reuse factor when a resource set is in use and the C/I value is below a given threshold;
increasing the optimal reuse factor when a resource set is not in use and the C/I value is above the given threshold;
assigning resources included in resource sets from the base station specific collection to served access terminals for scheduled transmissions; and
a processor, coupled to the memory, configured to execute the instructions retained in the memory.

48. An apparatus, comprising:
means for selecting a subset of resource sets based upon a first metric from a set of available resource sets commonly defined across a network to form a base station specific collection;

means for determining an optimal reuse factor corresponding to a base station based upon a second metric that considers level of service associated with at least one neighboring base station;

means for generating C/I values based upon resource specific CQI reports from non-served access terminals in an active set of a base station;

means for determining a lowest C/I value among a subset of the non-served access terminals in the active set of the base station for each available resource set;

means for decreasing the optimal reuse factor when a resource set is in use and the C/I value is below a given threshold;

means for increasing the optimal reuse factor when a resource set is not in use and the C/I value is above the given threshold; and means for assigning resources included in resource sets from the base station specific collection to served access terminals for scheduled transmissions.

49. A computer program product for facilitating distributed selection of resource sets to use for user assignments in a wireless communication environment, comprising:

a computer-readable storage medium comprising:

code for causing a computer to select a subset of resource sets based upon a first metric from a set of available resource sets commonly defined across a network to form a base station specific collection;

code for causing the computer to determine an optimal reuse factor corresponding to a base station based upon a second metric that considers level of service associated with at least one neighboring base station;

code for causing the computer to generate C/I values based upon resource specific CQI reports from non-served access terminals in an active set of a base station;

code for causing the computer to determine a lowest C/I value among a subset of the non-served access terminals in the active set of the base station for each available resource set;

code for causing the computer to decrease the optimal reuse factor when a resource set is in use and the C/I value is below a given threshold;

code for causing the computer to increase the optimal reuse factor when a resource set is not in use and the C/I value is above the given threshold; and code for causing the computer to assign resources included in resource sets from the base station specific collection to served access terminals for scheduled transmissions.

50. At least one processor configured for facilitating distributed selection of resource sets to use for user assignments in a wireless communication environment, comprising:

a first module for selecting a subset of resource sets based upon a first metric from a set of available resource sets commonly defined across a network to form a base station specific collection;

a second module for determining an optimal reuse factor corresponding to a base station based upon a second metric that considers level of service associated with at least one neighboring base station;

a third module for generating C/I values based upon resource specific CQI reports from non-served access terminals in an active set of a base station;

a fourth module for determining a lowest C/I value among a subset of the non-served access terminals in the active set of the base station for each available resource set;

a fifth module for decreasing the optimal reuse factor when a resource set is in use and the C/I value is below a given threshold;

a sixth module for increasing the optimal reuse factor when a resource set is not in use and the C/I value is above the given threshold; and a seventh module for assigning resources included in resource sets from the base station specific collection to served access terminals for scheduled transmissions.

51. A method that facilitates distributed selecting of resource sets to use for user assignments in a wireless communication environment, comprising:

selecting a subset of resource sets based upon a first metric from a set of available resource sets commonly defined across a network to form a base station specific collection;

determining an optimal reuse factor corresponding to a base station based upon a second metric that considers level of service associated with at least one neighboring base station, wherein the second metric is based upon a criterion that considers a data rate served;

assuming that each base station is optimized subject to a common data rate;

comparing a data rate of a base station to data rates of neighboring base stations;

determining an anticipated change in the data rate of the base station and anticipated changes in the data rates of the neighboring base stations for possible resource set exchanges;

dropping a resource set when the base station is determined to be advantaged based upon the comparison and the anticipated changes in the data rates of the base station and the neighboring base stations;

grabbing a resource set when the base station is determined to be disadvantaged based upon the comparison and the anticipated changes in the data rates of the base station and the neighboring base stations; and assigning resources included in resource sets from the base station specific collection to served access terminals for scheduled transmissions.

52. A wireless communications apparatus, comprising:

a memory that retains instructions related to:

selecting a subset of resource sets based upon a first metric from a set of available resource sets commonly defined across a network to form a base station specific collection;

determining an optimal reuse factor corresponding to a base station based upon a second metric that considers level of service associated with at least one neighboring base station, wherein the second metric is based upon a criterion that considers a data rate served;

assuming that each base station is optimized subject to a common data rate;

comparing a data rate of a base station to data rates of neighboring base stations;

determining an anticipated change in the data rate of the base station and anticipated changes in the data rates of the neighboring base stations for possible resource set exchanges;

dropping a resource set when the base station is determined to be advantaged based upon the comparison and the anticipated changes in the data rates of the base station and the neighboring base stations;

grabbing a resource set when the base station is determined to be disadvantaged based upon the comparison and the anticipated changes in the data rates of the base station and the neighboring base stations;

assigning resources included in resource sets from the base station specific collection to served access terminals for scheduled transmissions; and a processor, coupled to the memory, configured to execute the instructions retained in the memory.

53. An apparatus, comprising:
- means for selecting a subset of resource sets based upon a first metric from a set of available resource sets commonly defined across a network to form a base station specific collection;
- means for determining an optimal reuse factor corresponding to a base station based upon a second metric that considers level of service associated with at least one neighboring base station, wherein the second metric is based upon a criterion that considers a data rate served;
- means for assuming that each base station is optimized subject to a common data rate;
- means for comparing a data rate of a base station to data rates of neighboring base stations;
- means for determining an anticipated change in the data rate of the base station and anticipated changes in the data rates of the neighboring base stations for possible resource set exchanges;
- means for dropping a resource set when the base station is determined to be advantaged based upon the comparison and the anticipated changes in the data rates of the base station and the neighboring base stations;
- means for grabbing a resource set when the base station is determined to be disadvantaged based upon the comparison and the anticipated changes in the data rates of the base station and the neighboring base stations; and
- means for assigning resources included in resource sets from the base station specific collection to served access terminals for scheduled transmissions.

54. A computer program product for facilitating distributed selection of resource sets to use for user assignments in a wireless communication environment, comprising:
- a computer-readable storage medium comprising:
  - code for causing a computer to select a subset of resource sets based upon a first metric from a set of available resource sets commonly defined across a network to form a base station specific collection;
  - code for causing the computer to determine an optimal reuse factor corresponding to a base station based upon a second metric that considers level of service associated with at least one neighboring base station, wherein the second metric is based upon a criterion that considers a data rate served;
  - code for causing the computer to assume that each base station is optimized subject to a common data rate;
  - code for causing the computer to compare a data rate of a base station to data rates of neighboring base stations;
  - code for causing the computer to determine an anticipated change in the data rate of the base station and anticipated changes in the data rates of the neighboring base stations for possible resource set exchanges;
  - code for causing the computer to drop a resource set when the base station is determined to be advantaged based upon the comparison and the anticipated changes in the data rates of the base station and the neighboring base stations;
  - code for causing the computer to grab a resource set when the base station is determined to be disadvantaged based upon the comparison and the anticipated changes in the data rates of the base station and the neighboring base stations; and
  - code for causing the computer to assign resources included in resource sets from the base station specific collection to served access terminals for scheduled transmissions.

55. At least one processor configured for facilitating distributed selection of resource sets to use for user assignments in a wireless communication environment, comprising:
- a first module for selecting a subset of resource sets based upon a first metric from a set of available resource sets commonly defined across a network to form a base station specific collection;
- a second module for determining an optimal reuse factor corresponding to a base station based upon a second metric that considers level of service associated with at least one neighboring base station, wherein the second metric is based upon a criterion that considers a data rate served;
- a third module for assuming that each base station is optimized subject to a common data rate;
- a fourth module for comparing a data rate of a base station to data rates of neighboring base stations;
- a fifth module for determining an anticipated change in the data rate of the base station and anticipated changes in the data rates of the neighboring base stations for possible resource set exchanges;
- a sixth module for dropping a resource set when the base station is determined to be advantaged based upon the comparison and the anticipated changes in the data rates of the base station and the neighboring base stations;
- a seventh module for grabbing a resource set when the base station is determined to be disadvantaged based upon the comparison and the anticipated changes in the data rates of the base station and the neighboring base stations; and
- an eighth module for assigning resources included in resource sets from the base station specific collection to served access terminals for scheduled transmissions.

* * * * *